United States Patent [19]

Shimizu et al.

[11] Patent Number: 4,851,170
[45] Date of Patent: Jul. 25, 1989

[54] INJECTION CONTROL METHOD OF INJECTION MOLDING MACHINE

[75] Inventors: Miyuki Shimizu; Yoshihiko Yamazaki, both of Nagano, Japan

[73] Assignee: Nissei Plastics Industrial Co., Ltd., Japan

[21] Appl. No.: 849,027

[22] Filed: Apr. 7, 1986

[30] Foreign Application Priority Data

Apr. 12, 1985 [JP] Japan ................................. 60-78014

[51] Int. Cl.⁴ ............................................. B29C 45/76
[52] U.S. Cl. ................................ 264/40.5; 264/328.1; 425/135; 425/149
[58] Field of Search ................... 264/40.1, 40.5, 328.1, 264/40.3; 425/145, 149, 135

[56] References Cited

U.S. PATENT DOCUMENTS 4,540,359  9/1985  Yamazaki ........................... 425/135

FOREIGN PATENT DOCUMENTS 57-142337  9/1982  Japan ................................. 264/40.1
58-11128   1/1983  Japan ................................. 264/40.1

Primary Examiner—Jan H. Silbaugh
Assistant Examiner—Mary Lynn Fertig
Attorney, Agent, or Firm—Ostrolenk, Faber, Gerb & Soffen

[57] ABSTRACT

In an injection molding apparatus using a motor as a driving source, the injection speed and the injection pressure are controlled via a speed sensor, a pressure sensor and a closed loop control system, to provide higher accuracy and better operability during switching of the apparatus from an injection speed control phase to an injection pressure control phase and thereafter to a back pressure control phase.

14 Claims, 5 Drawing Sheets

FIG.1

INJECTION CONTROL METHOD OF INJECTION MOLDING MACHINE

BACKGROUND OF THE INVENTION

1. Field of the Invention

This invention relates to a injection control method for an injection molding machine, in which an injection mechanism is driven by a motor, and to the injection molding apparatus.

2. Prior Art

The techinques relating to the method and apparatus of the present invention are not generally known or seen. Only patents previously invented by this inventor, which are described in the U.S. Pat. No. 4,540,359 and Japanese patent No. 59-726, No. 59-224324 describe the method or the apparatus.

According to the above mentioned patents by setting an injection speed and a torque upper limit, and by employing the feedback of the injection speed, which is electrically detected by a speed sensor, and by adopting the closed loop control so that the injection speed may become the set point, the injection speed or the injection pressure is controlled in accordance with the mutual relationship, between the set points of the injection speed and the torque value, and the load applied on the driving source. The injection pressure control is effected by driving the motor by means of setting the torque value (the current upper limit value of the motor) through the open loop.

The speed control phase is carried out with a closed loop control which senses the injection speed, from the beginning of injection to the end of a period during which material is fed into the metal mold. In order to mitigate the adverse effect of the inertia force of the motor rotor, in a second phase, the control is changed to control the injection pressure rather than motor speed. This is done by changing the set point of the torque value (current upper limit value of motor), after a retarding control in which the injection speed is almost linearly reduced.

On account of the disadvantage in the characteristics of motor, even if the driving current value of motor is constant, output torque ripple and variation in the output torque due to the temperature change of motor are induced. Further the mechanical transmission efficiency of the driving system exerts an effect on the product, and there is a limit in accuracy in controlling the injection pressure (maintained pressure), so that products which do not meet the required quality standards are produced in some cases.

In order to solve the above described problems, the torque sensor, which is generally employed in the machine tool for detecting electrically the output of the motor, and the torque control apparatus which implements the closed loop are used together. However, because detection of the injection force at low cost and high accurancy has not been developed, and because the two controlling regions, one involving injection speed control and the other injection pressure control is primarily in another region certain difficulties arise which require intricate injection control, particularly in view of the use of closed loop control. Therefore, to date a suitable method for controlling the transition between the two control regions which is effective for eliminating the effect of the inertia force of motor rotor is not known. Since further method of switch timing is not fully developed, a solution to the above described problem is not available.

Although a detection method for injection of force has developed, and injection pressure control based on torque and using closed loop control is possible as is generally used in the machine tool, in addition to control problems remain injection force. The main problem relates to the inability of attaining control with with high accuracy. The reason is as follows. The load presented to the injection screw or the plunger is the melted resin. The force transmission mechanism of the motor is extremely low in stiffness, compared to the total stiffness of the system. Therefore in the transient period, a big difference develops between the set point, which generates the excessive motor output, and the measured value. Consequently, pressure vibration is induced.

SUMMARY OF THE INVENTION

The object of the present invention is to provide an injection control method and an apparatus, in relation to an injection molding machine which uses a motor as a driving source. Other characteristics of the apparatus are that the injection pressure is controlled by the injection pressure sensor, using torque limit control for limiting the upper value of the output torque of the motor in accordance with a set point of the injection pressure setting device. According to the present invention, the injection speed control process and the injection pressure control process are separately controlled during the injection process. In the transition from speed control to pressure control, the special retarding control which is used in the conventional method for controlling the effect of inertia of the motor, is not required. The operability of the apparatus is also improved. A high accuracy of injection molding is possible because of the injection speed and the injection pressure are both controlled via closed loop control.

The other object of the present invention is to provide an injection control method and an apparatus therefor. The upper limit of the current command value is restricted in accordance with the pressure command value. According to a further embodiment, the current detection signal value is corrected so that it increases or decreases in accordance with the degree of the pressure command value. Therefore, for either case, the speed command signal can be amplified by raising the amplification value of the pressure controlling amplifier, and the injection pressure reaches the set point of the injection pressure in an optimum manner.

The present invention relates to the injection control method which is integrated with the injection speed controlling process.

In the control method the injection apparatus which is equipped with a plunger or an injection screw driven by the motor so that the screw can rotate in both directions. The driving control for the motor is such that the speed of the injection screw or the plunger may become the set point of the injection speed setting device, using the speed value from the injection speed sensor as the feedback signal. The proceeding speed of the injection screw or the plunger is detected during the period from the beginning of injection to an end of a filling of material into the metal mold phase and during the injection pressure control process, wherein, when the filled material reaches the value previously set, switching of the set signal of the injection speed setting device to the set signal of the injection pressure setting device, the torque limit control, which restricts the upper limit of the output torque of the motor in accordance with the degree of the set point of the injection pressure setting device, is effected. Drive control for the motor is effected by using the measured value from the injection pressure sensor as the feedback signal. This signal detects the output torque applied to the load on the motor, so that the measured value may become the set point of the injection pressure setting device. The other aspect of the invention deals with the apparatus which is capable of being controlled according to the method of the present invention.

A more detailed explanation of the present invention is described using the embodiments shown in the drawings.

BRIEF DESCRIPTION OF THE DRAWINGS

FIG. 1 shows a block diagram of a first embodiment.

DETAILED DESCRIPTION OF THE INVENTION

Figure 1:
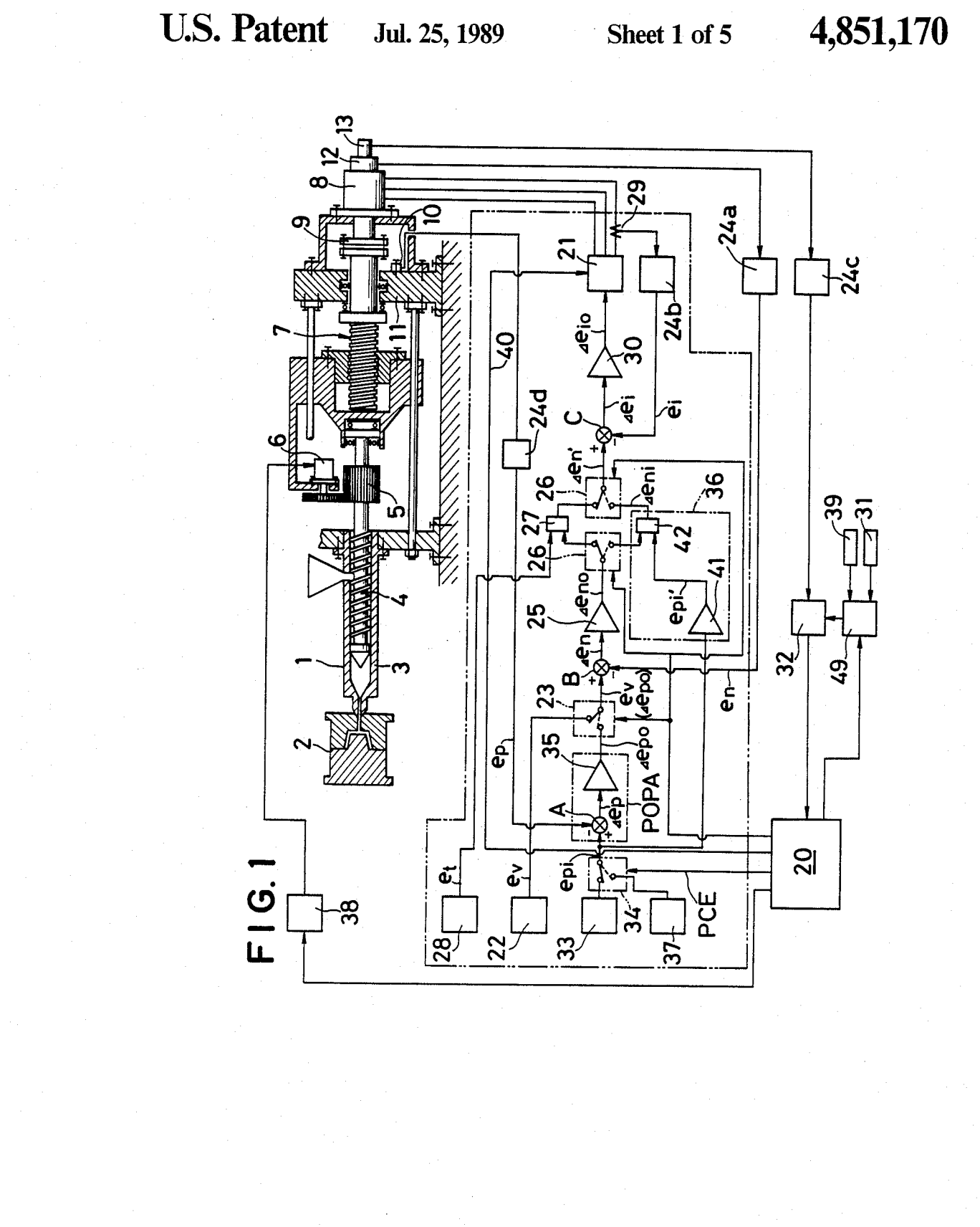
Figure 2:
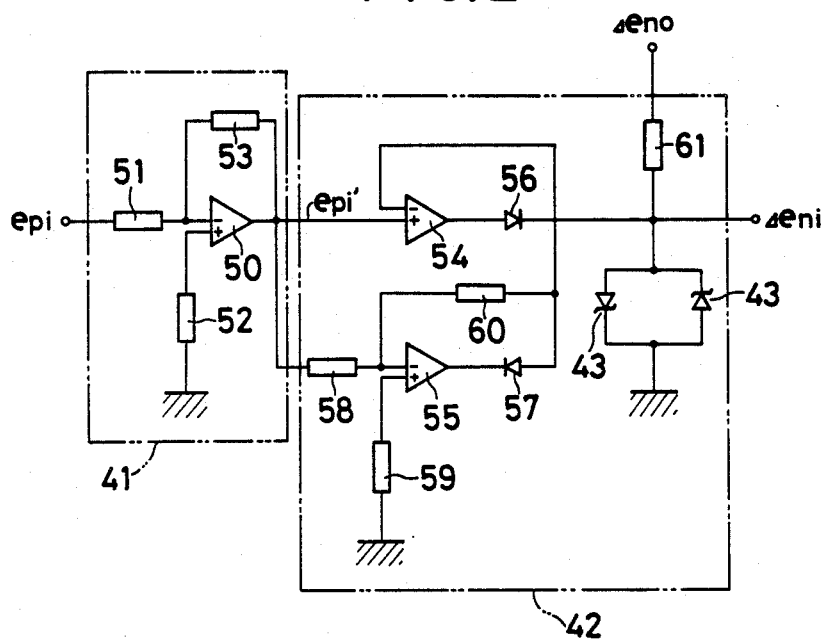
FIG. 2 is a circuit diagram showing an actual configuration of a current command signal limit circuit for FIG. 1.

In FIG. 1, an injection apparatus 1 has an injection screw 4, which can rotate in both directions and which is provided inside heating cylinder 3 connected with metal mold 2 at its nozzle portion.

Behind injection screw 4, motor 8 for rotating screw 4 is connected through gear mechanism 5. The back end of the injection screw 4 is directly connected to transmission mechanism 7 which is operable for driving the injection screw forward or backward through rotational means. The output shaft 9 of motor 8 is attached to the transmission mechanism.

The driving force of the above described motor 8 is transmitted to injection screw 4 through the transmission mechanism 7. The injection speed or the injection pressure or the back pressure can be controlled by controlling motor 8.

To measure the injection pressure which results from the pushing force of injection screw 4 or by detecting the deformation of the portion subjected to the reaction force due to the load, a strain gauge 10 is attached to support member 11 of transmission mechanism 7.

The tachometer generator 12 senses the speed of motor 8 and the rotational angle detector 13 is attached directly to motor 8 to detect the position of the injection screw 4 by detecting the rotational or angular position of motor 8.

Various control signals are transmitted from central controller 20 which controls all operations in the molding machine. The injection starts with the setting to an ON state of the power transducer operation command, which activates the power transducer.

The set signal ev supplied from injection speed setter 22 is used as the speed command signal. It is supplied to summing point B through command change-over switch 23. The speed detection signal detected by tachometer generator 12 is changed to injection speed detection signal en, which is a voltage signal, formed by transducing circuit 24a. The signal en is also supplied to summing point B. Consequently, an error signal (ev−en=Δen) is produced from summing point B, and this error signal Δen is amplified by amplifer 25 to become the current command signal Δeno. The signals is connected to torque limit circuit 27 through torque limit circuit switching device 26, where it is compared to set point signal et of the torque limit setter 28 in order to restrict the limit value of the motor current during the speed controlling period. The value is not changed when Δeno<et, however, when Δeno≧et, the value is changed to Δen′, which becomes the value of et. The value et is generated from the above described torque limit circuit 27 and is supplied to the summing point C through torque limit circuit switching device 26.

The motor current which is supplied to motor 8 and which determines the output torque of motor 8 is detected by current detector 29. The current character of this detection signal becomes a current detection signal ei, which is changed to a voltage signal in transducing circuit 24b, and which is supplied to the summing point C. As a result, the difference signal (Δen′−ei=Δei) is produced from the summing point C, and this difference signal Δei is amplified to Δeio by the current control amplifier 30, and then it is supplied to the above described power transducer 21. The above described power transducer 21 is integrated with an ignition control circuit employing thyristors or pulse pulse width control circuits using transistors, to supply the required current to motor 8 to drive motor 8 in accordance with the above described signal Δeio.

As described above, injection speed control is carried out by feedback control. The injection filling phase is continued by the injection speed control, the signal of the above described rotational angle detector 13 is changed to the position signal of the injection screw by the transducing circuit 24c, and this position signal is compared by comparator 32 to the set point signal of the pressure switching setter 31 which sets the position of the injection screw which changes the control from the injection speed control to injection pressure control through a command from central controller 20, when these signal values match one another, The switching command is transmitted to the command change-over switch 23 and the torque limit circuit switching device 26 from the central controller 20. The control is then changed from injectioon speed control to injection pressure control.

The set point signal epi of injection pressure setting device 33 is supplied to summing point A through pressure setter switching device 34. Also, the signal of the injection pressure sensor 10 is changed to injection pressure signal ep, which is transformed to a voltage signal in transducing circuit 24d to be supplied to summing point A. Consequently, the difference signal (epi−ep=Δep) is produced from summing point A, and this signal is amplified to the signal Δepo by the pressure control amplifier 35 in the pressure ooperational amplifying circuit (POPA). It becomes the speed command signal ev(Δepo=ev) after passing the said command change-over switch 23 (for ease of explanation, the signal Δepo is referred to as the signal ev).

As previously, the speed command signal ev becomes the difference signal Δen after it is added to the signal en at summing point B. It is amplified to the signal Δeno by speed control amplifier 25. Signal Δeno through above described torque limit circuit switching device 26 is supplied to current command signal limit circuit 36, which limits the value of the current command value in accordance with the set signal epi of the above described injection pressure setter 33, and becomes the signal Δen. This signal is outputted from current command signal control limit circuit 36, and becomes the current command signal Δeno' after passing torque limit circuit switching device 27 (Δeni=Δen', for convenience, the symbol is changed.), and is supplied to summing point C. It then becomes the difference signal Δei after being added to the current detection signal ei. It is amplified to the signal Δeio by current control amplifier 30.

The signal Δeio is supplied to the above described power transducer 21, and the required current is supplied to the motor 8 to drive it in accordance with the signal Δeio.

As described above, the injection pressure control is achieved by controlling the driving signals of motor 8 so that the injection pressure becomes the injection pressure set point. When a preset injection time elapses, central controller 20 sends an injection finish signal and generates a pressure switching command supplied to the pressure setter switching device 34. The circuit is switched from the injection pressure setter circuit 33 to the back pressure setter circuit 37. Motor 8 is controlled as during the above injection pressure control by the pressure command signal epi (for convenience, the symbols for injection pressure set point signal and back pressure set point signal the same.), the control is shifted from the injection pressure control process to the so called back pressure control process. When the required time elapses from the end of the injection process, central controller 20 sends a screw rotation command to motor driving device 38 and motor 6 for screw rotation begins to rotate, and the injection screw 4 is rotated, and then the so called weighing is done during the back pressure control phase. The injection screw 4 delivers the material forward and rotates to the opposite direction during the back pressure control phase.

The screw position signal is compared to the signal from the weight limit setter 39 by comparator 32. When the screw position agrees with the set weight limit position, central controller 20 stops power transducer circuit 21 through command line 40, the motor driving device 38, the pressure setter switching device 34, the command change-over switch 23 and the torque limit circuit switching device 26, thus, the weighing process is ended and the apparatus waits for the next injection process.

The distinquishing characteristic in this apparatus is, in the pressure control, phase in that the current command signal limit circuit 36, which restricts the upper limit of the current command value in accordance with the pressure command value (the set point of the injection pressure setter or the set point of the back pressure setter), is added to the speed control amplifier 25.

This current command signal limit circuit 36 includes amplifier 41, comprised of the operational amplifiers 50 and resistances 51, 52, 53, and further includes output limit circuit 42 comprised of operational amplifiers 54, 55, diodes 56, 57, zener diodes 43, 43 and resistances 58, 59, 60, 61, as shown in FIG. 2. The set point signal epi of the injection pressure setter or the back pressure setter 37 is amplified with the required degree of amplification by amplifier 41, and is outputted to be a pressure command signal epi'. The current command signal Δeno from speed control amplifier 25 and the pressure command signal epi' from amplifier 41 are input to the output limit circuit 42 which changes the upper limit value of the current command value in accordance with the pressure command value. In other words, the current command signal Δeni, is restricted to a small upper limit value when the pressure command value is small and to a large upper limit value when the pressure command value is large limit.

Figure 3:
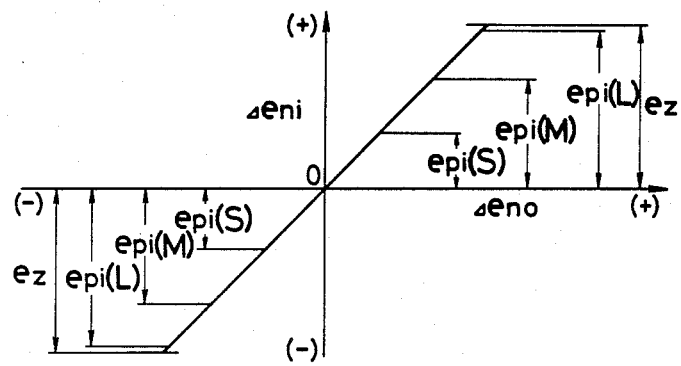
FIG. 3 is a characteristic curve showing an example of the characteristic of the current command signal limit circuit.

FIG. 3 is a characteristic curve which shows the relationship between the input signal Δeno and the output signal Δeni of the current command signal limit circuit with the parameter of the magnitude of the pressure command signal epi. As shown in the FIG. 3, the magnitude of the output signal is limited by to the low value of the input signal when the magnitude of the pressure command signal epi is small.

In this case, the set point signal epi is set to be small, in the case where the pressure command signal epi' value is smaller that the value of the zener voltage ez of zener diodes 43, 43, the value of the output signal is restricted to the value of the pressure command signal epi'. The saturated value (maximum value) ez of the output signal, in this case, is the value determined by the zener voltage of the zener diode 43 in the output limit circuit 42 of FIG. 2.

In this way, in the embodiment shown herein, the current command value is limited or clamped by the magnitude of the pressure command value. If the pressure command value has exceeded a predetermined value, the current command value is limited to the predetermined value.

Figure 7:
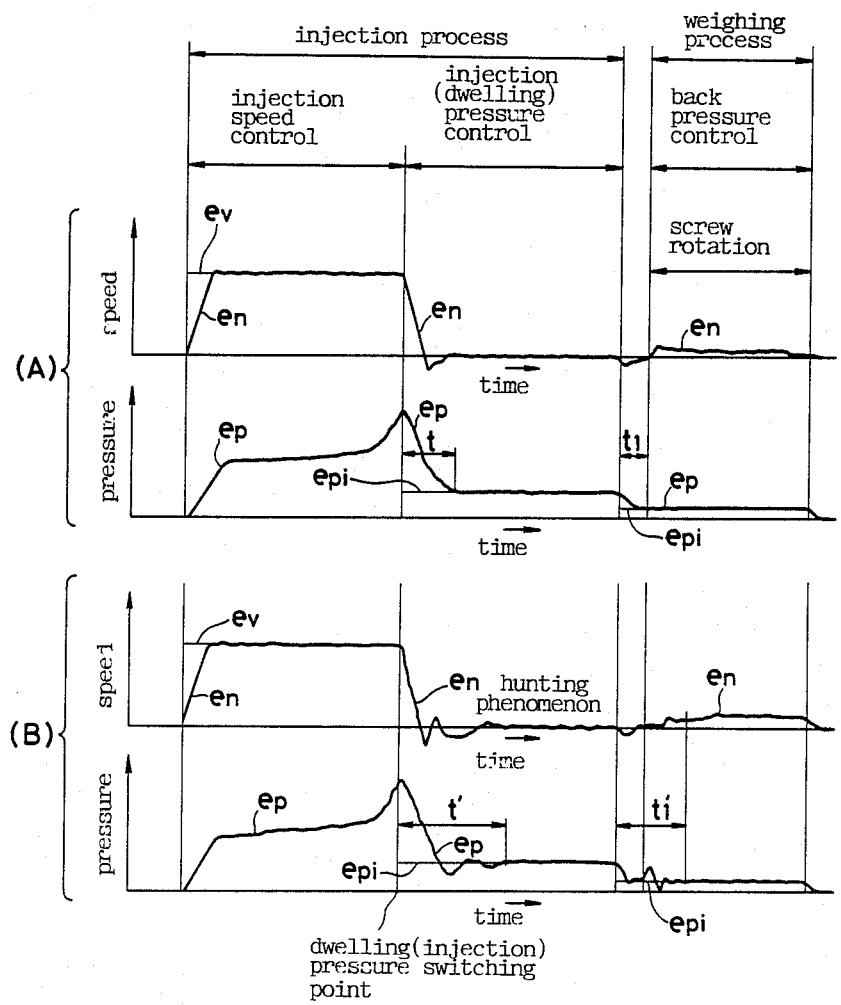
FIG. 7 depicts characteristics curves which show the set points of the pressure and the speed in the injection processes of the present embodiment (A), the conventional embodiment (B) and in the weighing process, and also shows comparisons of the actual speed value and its set point.

Therefore, the speed command signal Δepo can be amplified by raising the amplification factor of the pressure control amplifier 35 to thereby improve the pressure response characteristic of the load against the pressure command. FIG. 7A provides waveforms which can be compared to conventional waveforms shown in FIG. 7B.

Thus it is seen that in the transient period from the speed control to the pressure control, the settling time t according to the present invention, during which the injection pressure approaches the set point, is smaller than t' in the prior art FIG. 7B. Similarly, the settling time $t_1$, in which the pressure command value is changed from the injection pressure to the back pressure, is smaller than $t'_1$. Note that the pressure hunting phenomenon of the prior art is hardly noticeable in the device of the present invention.

Therefore, switching control from the injection speed phase to the injection pressure control phase and then from the injection pressure control phase to the back pressure control phase can be done with high accuracy.

Figure 4:
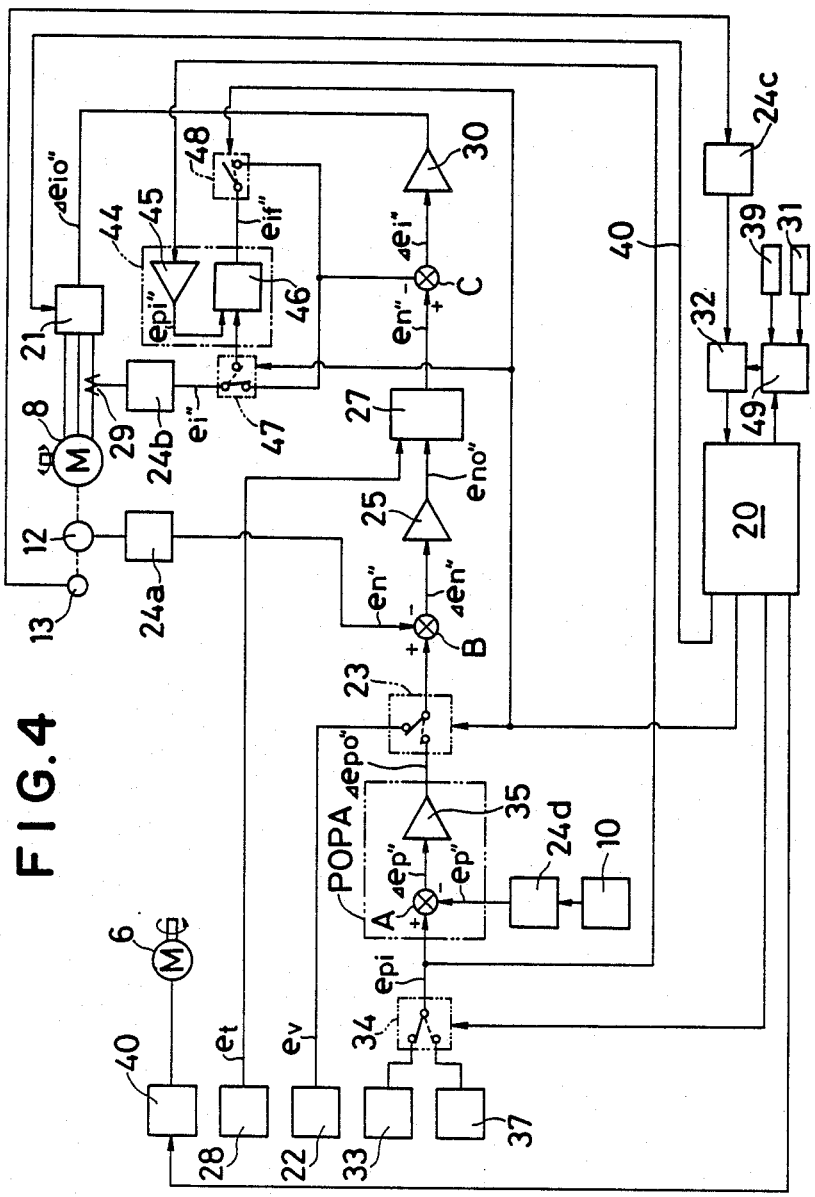
FIG. 4 is a block diagram showing a second embodiment.
Figure 5:
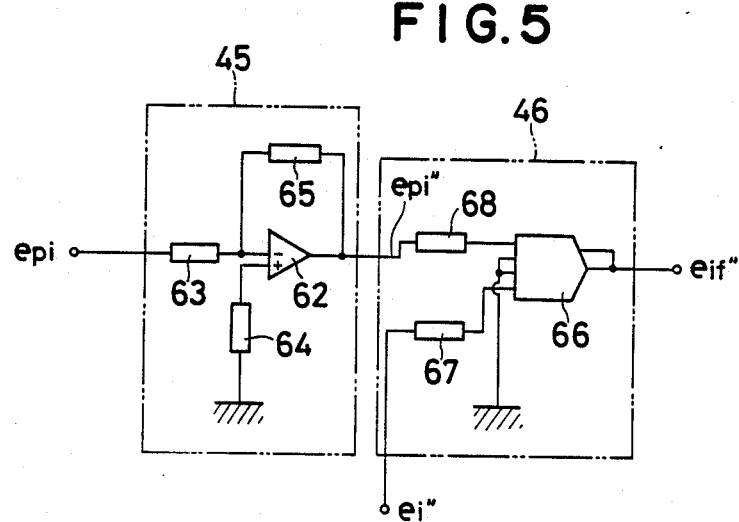
FIG. 5 is a circuit diagram showing an embodiment of the current detection signal correction circuit of FIG. 4.

FIG. 4 shows a second embodiment of the present invention. In the FIGURE, the mechanism shown in FIG. 1 is not repeated, and the same symbols are given to the same elements of the apparatus as in FIG. 1.

The distinquishing feature in this embodiment is that the current detection signal correction circuit 44, which corrects the current detection signal to be increased or decreased in accordance with the degree of the pressure command value, is added to the transducing circuit 24b so as to operate in the pressure control period.

This current detection signal correction circuit 44 includes amplifier 45, comprised of operational amplifier 62 and resistances 63, 64, 65, and feedback signal transducing circuit 46.

The output command signal epi from the injection pressure setter 33 or from the back pressure setter 37 is amplified with the required degree of amplification by amplifier 45, and is produced as the pressure command signal epi". The feedback signal transducing circuit 46 includes the well known multiplier 66 and resistances 67, 68, by receiving the pressure command signal epi" and the current detectioon signal ei" from the transducing circuit 24b as the input signal to output the current detectioin signal eif", The latter signal is corrected so that the current detection signal value may be reduced when the pressure command value is small and the current detection signal value may be increased when the pressure command value is large. 47 and 48 denote current detection signal correction circuit switching devices.

Figure 6:
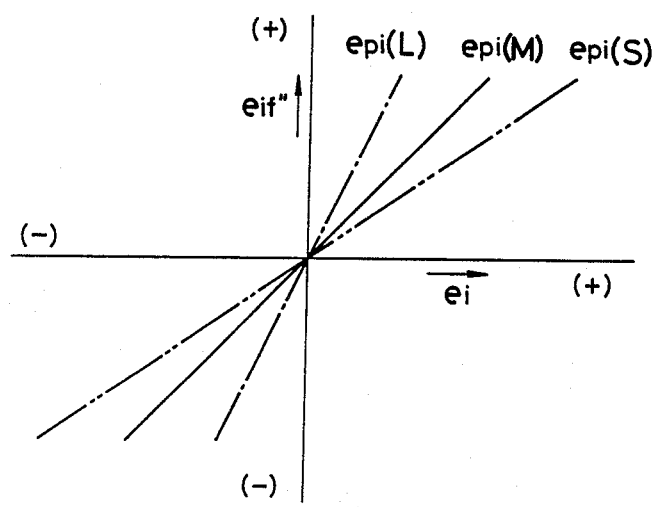
FIG. 6 is a characteristic curve showing an example of the characteristic of the current detection signal correction circuit.

FIG. 6 shows a characteristic curve, in which the relationship between the input signal ei" and the output signal eif" of the current detection signal correction circuit is described with the parameter of the degree of the pressure command signal epi. As shown in the same figure, the output signal becomes large when the pressure command signal epi is large with the same input signal. In this manner, in the present embodiment, as the current detection signal value is corrected to be increased or decreased in accordance with the degree of the pressure command value, the value of the current detection signal value in the speed control becomes larger when the pressure command value is larger than is characteristic of conventional apparatuses.

Therefore, as above, since the speed control signal Δepo can be increased by raising the degree of amplification of the pressure control amplifier 35, as shown in FIG. 7A, the response characteristic of the pressure is improved. The switching control from the injection speed control phase to the injection pressure control phase and from the injection pressure control phase to the back pressure control phase can be effected faster and with greater accuracy.

In the present embodiment, the switching over from the injection speed control phase to the injection pressure control phase is through detecting the screw position. However, it may be accomplished by detecting the filled quantity of resin through detection of the metal mold cavity resin pressure value, the injection pressure value and the current value of the motor.

If necessary for some products, the multistage control, using the screw positions or the timer may be adopted for one of the injection speed control and the injection pressure control or for the both of them.

The torque sensor may be attached to the output shaft of the motor as the detection method of the injection pressure.

The present invention, of course, can be applied to the so called preplasticizing type injection apparatus equipped with the preplasticizing device, or to the plunger type injection apparatus.

What is claimed is:

1. A method for controlling an injection molding machine of the type having a motor which is driven during a pressure control phase of the machine to establish a predetermined pressure level in the machine, the method comprising:
   supplying a pressure set point signal which is representative of the predetermined pressure level to be established;
   measuring an instantaneous pressure in the machine and an instantaneous speed of the motor and generating therefrom, respectively, an instantaneous pressure signal and instantaneous speed signal;
   combining the pressure set point signal with the instantaneous signals to derive a net signal;
   comparing the net signal to an amplified value of the pressure set point signal and limiting the net signal to a value which does not exceed the amplified value of the pressure set point signal; and
   deriving from the limited net signal motor drive signals and applying the motor drive signals to the motor and driving the motor therewith for establishing the predetermined pressure level in the machine.

2. The method of claim 1, in which the comparing step includes limiting the value of the net signal to the amplified value of the pressure set point signal when the scaled value is below a predetermined value and limiting the net signal below the predetermined value when the amplified value is larger than the predetermined value.

3. The method of claim 2, further comprising measuring an instantaneous current which is representative of an instantaneous current flowing through the motor and modifying the limited net signal based on the measured instantaneous current.

4. The method of claim 2, further comprising the step of supplying a back pressure control signal and substituting, during a phase which follows the pressure control phase of the injection molding machine, the back pressure control signal for the pressure set point signal.

5. A control method for controlling an injection molding machine of the type having a motor which is driven during a first phase and thereafter during a second phase to control injection parameters of the machine, comprising the steps of:
   supplying an injection speed set signal which is representative of a predetermined speed at which the motor is to be driven during the first phase;
   measuring the instantaneous speed of the motor and conditioning the injection speed set signal based on the value of the measured instantaneous speed to produce a first net injection speed control signal;
   generating from the first net injection speed control signal motor drive signals and applying the motor drive signals to the motor to accelerate the motor to the predetermined speed during the first phase;
   disconnecting from the control circuit, at the conclusion of the first phase, the injection speed set signal;
   supplying to the control circuit, during the second phase, a pressure set point signal which is representative of a predetermined pressure level which is to be established in the machine during the second phase;
   measuring an instantaneous pressure in the machine and conditioning the pressure set signal based on the value of the measured instantaneous pressure and further based on the instantaneous measured speed to produce therefrom a second net injection speed control signal;
   producing a limited net injection signal by limiting the value of the second net signal to a value which does not exceed an amplified value of the pressure set point signal; and producing the drive signals for the motor during the second phase from the limited net injection signal.

6. The method of claim 5, further comprising measuring an instantaneous current which is representative of an instantaneous current flowing in the motor and combining the measured instantaneous current with the first net injection speed control signal during the first phase.

7. The method of claim 5, in which the step of limiting the second net injection speed control signal includes the further step of scaling the pressure set point signal in an amplifier to produce the amplified pressure set point signal.

8. The method of claim 7, in which the limiting step further includes the step of limiting the value of the second net injection speed control signal to the value of the amplified pressure set point signal when the amplified signal is below a predetermined value and limiting the second net injection speed control singal to the predetermined value when the amplified signal is larger than the predetermined value.

9. The method of claim 8, further including measuring an instantaneous current which is representative of an instantaneous current flowing in the motor and combining the limited injection speed control signal with the measured instantaneous current.

10. The method of claim 8, wherein the injection molding machine includes an injection screw and including driving the injection screw by the motor.

11. The method of claim 8, wherein the injection molding machine includes a plunger and including driving the plunger by the motor.

12. The method as in claim 8, further comprising the step of limiting, during the first phase, the value of the first net injection speed control signal to a level which does not cause the motor to exceed a maximum motor speed.

13. The method of claim 8, further comprising the step of supplying a back pressure control signal and substituting, during a phase which follows the second phase of the injection molding machine, the back pressure control signal for the pressure set point signal.

14. A control method for controlling an injection molding machine of the type having a motor which is driven during a first injection speed controol phase and thereafter during a second injection pressure control phase, comprising the steps of:

supplying to a control circuit an injection speed set signal which is representative of a predetermined speed at which the motor is to be driven during the first phase;

measuring an instantaneous speed of the motor and conditioning the injection speed set signal by reference to the measured instantaneous speed to produce therefrom a first injection speed control signal;

deriving, from the first injection speed control signal motor drive signals and applying the motor drive signals to the motor to accelerate the motor to the predetermined motor speed, during the first phase;

disconnecting from the control circuit, at the end of the first phase, the injection speed set signal;

supplying to the control circuit, during the second phase, a pressure set point signal which is representative of a predetermined pressure level which is to be established in the machine during the second phase and deriving from the pressure set point signal a second injection speed control signal;

sensing an instantaneous current signal which is representative of an instantaneous current flowing in the motor;

amplifying the pressure set point signal and deriving therefrom a limiting signal and limiting the instantaneous current signal on the basis of a comparison thereof to the limiting signal; and modifying the second injection speed control signal based on the limited instantaneous current signal and generating the drive signals on the basis of the modified second injection speed control signal, during the second phase.

* * * * *